United States Patent [19]

Kishiro et al.

[11] Patent Number: 5,091,909
[45] Date of Patent: Feb. 25, 1992

[54] METHOD FOR WRITING/READING OF DATA IN MAGNETIC DISK SUBSYSTEM

[75] Inventors: Shigeru Kishiro; Tomohito Ogino; Yoshiaki Muto; Katsunori Nakamura; Yoshiro Shiroyanagi, all of Odawara, Japan

[73] Assignees: Hitachi, Ltd., Tokyo; Hitachi Computer Engineering Co., Ltd., Kanagasa, both of Japan

[21] Appl. No.: 288,150

[22] Filed: Dec. 22, 1988

[30] Foreign Application Priority Data

Dec. 26, 1987 [JP] Japan ............................ 62-328339

[51] Int. Cl.$^5$ ............................................ G06F 12/08
[52] U.S. Cl. ............................ 371/40.1; 364/251.2; 364/DIG. 1
[58] Field of Search ................ 360/27, 49, 50, 83, 360/72.1; 369/33, 200 MS File; 371/40.1, 42

[56] References Cited

U.S. PATENT DOCUMENTS 4,271,519 6/1981 Hall .................................... 371/40.1
4,745,604 5/1988 Patel et al. ........................ 371/37.2

FOREIGN PATENT DOCUMENTS 54-106132 8/1979 Japan .

Primary Examiner—Stephen M. Baker
Attorney, Agent, or Firm—Fay, Sharpe, Beall, Fagan, Minnich & McKee

[57] ABSTRACT

When recording records into the IC memory group of a magnetic disk subsystem the records being composed of a count area of a fixed length, key area of a variable length and a data area of a variable length, data of a special format which is judged by ECC check to be an abnormal data is written at the top of the count area in each record. When reading an object record from the IC memory group, it is judged by ECC check whether or not the read data is an abnormal one. When the read data is judged to be an abnormal one, the read data is compared with the data of special format, and when there is found a coincidence between them, it is recognized that the read data are at the top of the count area. When writing data, data which are judged by ECC check to be a normal are suffixed to data which are judged by ECC check to be abnormal. When the read data are judged by the ECC check to be abnormal and judged by a next ECC check to be normal, it is recognized that the read data are at the top of the count area.

18 Claims, 7 Drawing Sheets

METHOD FOR WRITING/READING OF DATA IN MAGNETIC DISK SUBSYSTEM

BACKGROUND OF THE INVENTION a) Field of the Invention

The present invention relates to a method for writing/reading of data in a magnetic disk subsystem, and more particularly to a method for writing/reading of data in a magnetic disk subsystem such as a disk cache, semiconductor memory unit or the like, which method is optimum for rapid access to an object record in an IC memory, where the IC memory is the recording medium used in the magnetic disk subsystem. It should be noted that the term "semiconductor memory units" encountered herein refers to memory units of which the data format is the same as in the magnetic disk memory units, and the CPU is composed of an IC group to which direct access can be made as for the magnetic disk units. The semiconductor memory unit is also called a "semiconductor disk unit".

b) Description of the Related Art

The data access method in the conventional magnetic disk subsystem will be explained, taking a disk cache by way of example.

FIG. 1 (a) shows a track format on the magnetic disk, which is formed by the variable-length record system called "count key data (CKD)" system. In FIG. 1 (a), there is shown a track format for one track. As shown, there are formed on the track T1' a home address HA of a fixed length and a plurality of records R1' to Rn'. Each of the records R1' to Rn' is composed of a count area C of a fixed length, a key area K of a variable length and a data area D of a variable length as shown. There are also provided gap areas of a fixed length (not shown) before each of the records R1' to Rn', between the count area C and key area K, and between the key area K and data area D, respectively. Similarly, gap areas of a fixed length are provided between the index marker IM' and home address HA'.

In the above-mentioned configuration of the track T1', the count area C is provided for writing therein of the information such as the address of the track, record No., length of the key area K, length of the data area D, etc. The record address is defined by the track address and record No. in the count area C. The key area K is an indicator and it is provided for writing therein of information such as the numbers allocated to the employees of a company, their social insurance Nos., numbers allocated to the customers, etc.

The above-mentioned track format is formed on a magnetic disk as will be described below. That is, as shown in FIG. 1 (c), the record area on the magnetic disk is divided into plural sectors, each of a predetermined angle, and the sectors are assigned sector Nos. S140 to Sn', respectively. The track index marker IM' is provided for each track between the sectors Sn' and S1'. In FIGS. (a) and (c), the record Rn', for example, is stored in the sector Sm' in the track T1' (not shown in FIG. 1 (c)).

The magnetic head provided in the magnetic disk unit is brought as follows to an object record on the track. Namely, first the magnetic head is positioned on the object track. Next, the magnetic head detects the address marker (not shown) provided before each of the count areas C and is sequentially positioned to the count areas C of the record. As the magnetic disk rotates, the magnetic head reads the track address and record No. stored in each of the count areas C. Based on the track address and record No. sequentially read by the magnetic head, it is judged whether the record to which the magnetic is currently positioned is the object. When the record to which the magnetic head is currently positioned is judged to be the object data is written into or read from the data area D in the record.

Next, data recording in a disk cache will be explained below. Generally, the IC memory group in the disk cache is divided into units, each of which can accommodate the data for one track on the disk. Each unit is called a track slot. Therefore, one track slot stores the data for one track on the magnetic disk unit. FIG. 1 (b) shows an example in which the data for one track shown in FIG. 1 (a) including the gap area are copied as is into the IC memory group in the disk cache. As shown, the home address HA and records R1' to Rn' on the magnetic disk are formed as they are in the track slot TS1'. Generally, for writing data into the IC memory group in the disk cache, an error correction code (ECC) of a few bits is added for every set of data of a few bytes.

As is well known, the error correction code (ECC) is used at the time of reading data from the IC memory to check whether the data have been read correctly or not. In FIG. 2, for example, data of 4 bytes D1, D2, D3, . . . are written with 1-byte error correction codes (ECC) E1, E2, E3, . . . added, respectively. At the time of reading, the data D1 and error correction code E1 are read simultaneously, and it is judged whether the combination of the data D1 and error correction code E1 is valid or not. When the combination is judged to be valid, the data D1 are verified as having been read correctly. If the combination is judged to be invalid, it means that an error has occurred in the reading of the data D1. This is also true for the relationship between the data D2 and error correction code E2, for the data D3 and error correction code E3, etc.

Next, the conventional method for access to an object record in an IC memory group in a disk cache will be explained below. The operation for access to the count area (C) 110' within the record Rn' in the track slot TS1' will be explained with reference to FIG. 1 (b).

First, the application of the data read from a magnetic disk unit to the data read from the IC memory group in a disk cache will be explained. As shown in FIG. 1 (b), the count area (C) 110' within the record Rn' in the track slot TS1' belongs to the sector Sm' which exists between the addresses AD11' and AD14' of the track slot TS'. The address AD11' of the sector Sm' can be determined by a well-known method from the total capacity of one track on the magnetic disk and the number of sectors of one track. Therefore, the controller for disk cache permits access to begin at the address AD11' of the track slot TS1'. However, when the track T1' on the magnetic disk shown in FIG. 1 (a) has been copied into the IC memory group as shown in FIG. 1 (b), it is not possible to know whether the data sequentially read from the address AD11' belongs to the gap area, count area C, key area K or data area D. This is because for example, if the data read from the IC memory group in the disk cache is of 4 bytes, $2^{32}$ patterns exist because one byte consists of 8 bits. Therefore, the data read from the IC memory group possibly takes the same pattern as the data in the gap area and the same pattern as that of the address marker.

For the above-mentioned reason, an object record in the track slot TS1' in the disk cache is accessed usually in any of the following two manners.

The first method is as follows. The top address AD4' of the record R1' in the track slot TS1' shown in FIG. 1 (b) is determined by adding, to the top address AD0' of the track slot TS1', the address length of the gap area 101', address length of the home address (HA') 102' and the address length of the gap area 103'. Next, the top address AD10' of the record R2' is determined by adding, to the address AD4', the address length of the count area (C) 104', address length of the key area (K) 106', address length of the data area (D) 108', and the address length of each of the gap areas 105', 107' and 109'. The address length of the key area (K) 106' and that of the data area (D) 108' can be determined by reading the data in the count area (K) 104'. By a similar method, the top address of each record can be determined sequentially. Finally, the top address AD12' of the object record Rn' is determined. Then, by reading the address data in the count area (C) 110', the top address AD14' of the data area (C) 110' in the record Rn' can be determined. Thus, it is possible to read the data in the data area (D) 114' in the record Rn'.

The second method is as follows. As shown in FIG. 3, a table listing the top addresses of all the records existing in each track slot is stored into the memory. For access to an object record, the top address of the object record is read from the above-mentioned memory, and by the access to the address thus read, the object data can be obtained.

However, the above-mentioned first method is disadvantageous in that since the top addresses of the records existing on the track slot are searched sequentially, it takes a long time until an object record is accessed.

The above-mentioned second method is also disadvantageous in that, since it is necessary to store the top addresses of all records existing on each track slot, a memory of a huge capacity is required.

It should be noted that a conventional technique as related to this invention is disclosed in the Japanese Unexamined Patent Publication No. 54-106132.

SUMMARY OF THE INVENTION

The present invention has as an object to provide a method for data write/read in a disk subsystem such as a disk cache, semiconductor memory unit, etc., in which an object record can be rapidly accessed from multiple records stored in the IC memory group in the disk subsystem.

The present invention has as another object to provide a method for data write/read in a magnetic disk subsystem such as a disk cache, semiconductor memory unit, etc., which does not need any memory of a big capacity for storage of top addresses of each record when access is made to an object record among many records stored in the IC memory group in the disk subsystem.

The magnetic disk subsystem referred to in the present invention is as follows. When a record composed of a count area of a fixed length, key area of a variable length and data area of a variable length is recorded into the IC memory, data of a special format which are judged to be erroneous when checked with an error correction code (ECC) are written at the beginning of the count area in each record. At the time of reading, it is judged by ECC check whether or not the read data are erroneous. When the data are judged to be erroneous, the data are recognized as the data of special format and thus as the top of a count area.

These and other objects and advantages of the present invention will be better understood from the ensuing description including, by way of example, the disclosed preferred embodiments with reference to the drawings.

BRIEF DESCRIPTION OF THE DRAWINGS

FIG. 1 (b) shows an example data format of a track slot stored into the IC memory group within a disk cache;

FIG. 1 (c) is an explanatory drawing of sectors on the magnetic disk;

FIG. 6 (b) shows a data format of a track slot which is stored into the IC memory group in the disk cache according to the embodiment shown in FIG. 5;

DETAILED DESCRIPTION OF THE PREFERRED EMBODIMENTS

Figure 4:
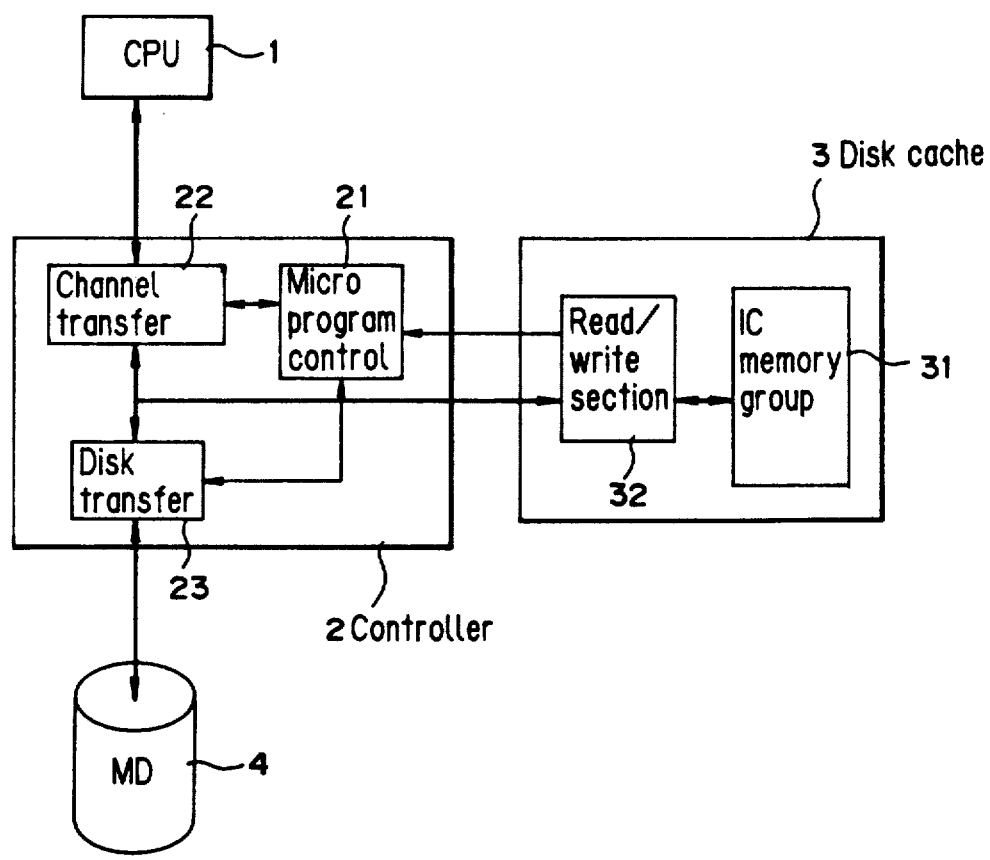
FIG. 4 is a block diagram of an example computer system to which the present invention is applied.

FIG. 4 is a block diagram showing an example computer system to which the present invention is applied. As shown, the computer system consists of a central processing unit 1, controller 2, disk cache 3 and a magnetic disk unit 4. The controller 2 is composed of a micro program controller 21, channel transfer unit 22 and a disk transfer unit 23. The micro program controller 21 controls the data read from the magnetic disk unit 4, data written into the disk cache 23, etc. The channel transfer unit 22 and disk transfer unit 23 are used for data transfer between the central processing unit (hereinafter referred to as "CPU") 1 and magnetic disk unit 4 as well as between the CPU 1 and disk cache 3.

The disk cache 3 is composed of an IC memory group 31 and read/write section 32.

In FIG. 4, when it is necessary to read data from, or write data into, the magnetic disk unit 4, the CPU 1 issues to the controller 2 a command or commands for the input/output operation. The command or commands contain as parameters a track address, sector No. and record No. for defining a record from which data input or output is to be done. The record No. is a number indicative of the position of a record counted from the track index marker at the top of a track.

Receiving the above-mentioned command or commands through the channel transfer unit 22, the micro program controller 21 of the controller 2 judges whether an object record (to which the above-mentioned read operation is to be done) exists or not in an IC memory group 31 in the disk cache 3. When the object record is judged to exist in the IC memory group 31, the micro program controller 21 gives the disk cache 3 an instruction to read the object record. If the object record is judged not to exists in the IC memory group 31, the micro program controller 31 issues to the magnetic disk unit 4 an instruction to position the magnetic head to the object record, read the data from the object record, transfer the data thus read to the CPU 1 and store the data into the IC memory group 21 of the disk cache 3. At this time, the records stored into the IC memory group 31 includes not only the above-mentioned object record but all the other records on a track in which the object record exists, because there is a high possibility that the records existing in the track in which the above-mentioned object record exists are read from the CPU 1 in the subsequent operations.

Since the present invention relates to a method for record write/read in a magnetic subsystem such as a disk cache, the operation for storage of records for one track, read from the magnetic disk unit, into the IC memory group 31 of the disk cache, 3 and the accessing operation for a read operation of a certain one of the records stored in the IC memory group 31 of the disk cache 3 will be described below.

Figure 5:
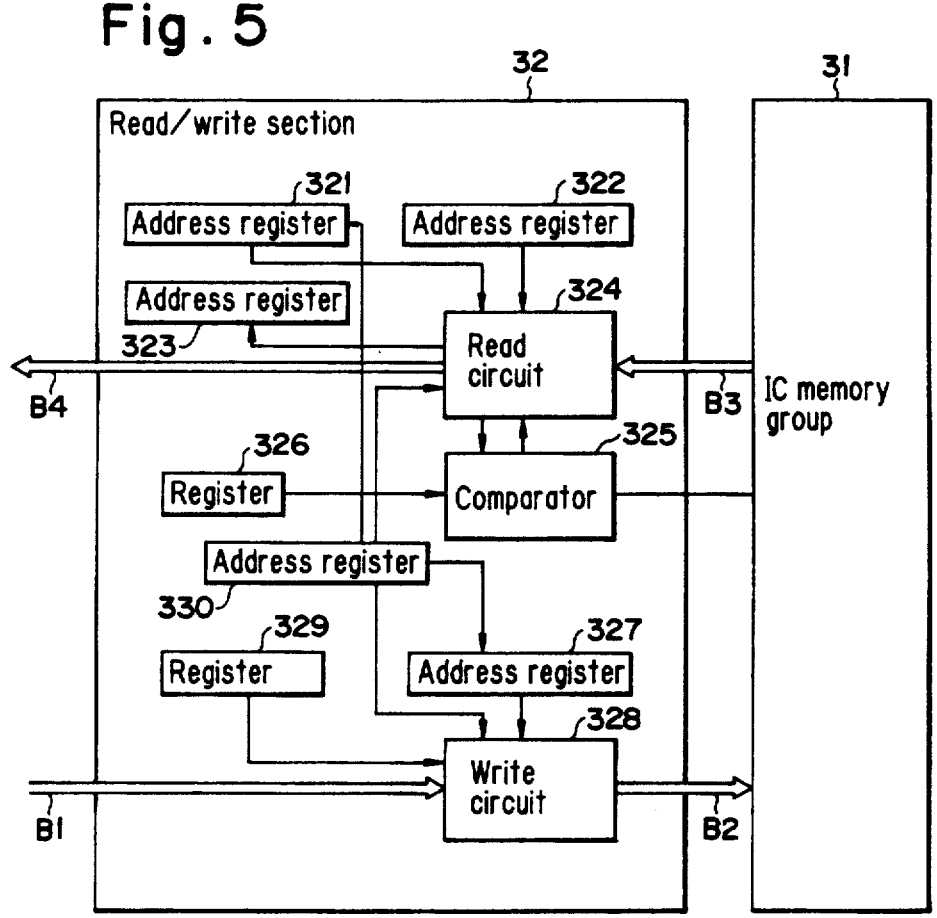
FIG. 5 is a block diagram of an embodiment of the present invention in which the present invention is applied to a disk cache.

FIG. 5 is a block diagram showing one embodiment in which the present invention is applied to the disk cache. The disk cache 3 shown in FIG. 4 is composed of the IC memory group 31 and a read/write section 32. As shown in FIG. 5, the read/write section 32 includes address registers 321, 322, 323, 327 and 330 and registers 326 and 329 which hold data of a special format, and also comprises a comparator 325, write circuit 328 and read circuit 324.

The address register 321 is provided to store a read start address of the IC memory group 31. The address register 322 is intended for storage of a read end address of the IC memory group 31. The address register 323 is provided to store the top address of a record detected The address register 330 is a register for holding the top addresses of areas HA, C, K, etc. when data is written into or read from the IC memory group 31. The address register 327 is provided to hold the write start address. The registers 326 and 329 are provided to store the data of special format which are to be added to the top of the count area C.

Figure 1A:
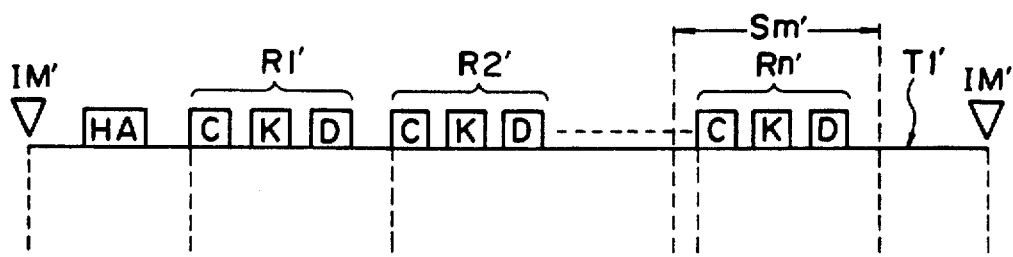
FIG. 1 (a) shows an example data format for storage of data into a track on a magnetic disk.
Figure 1B:
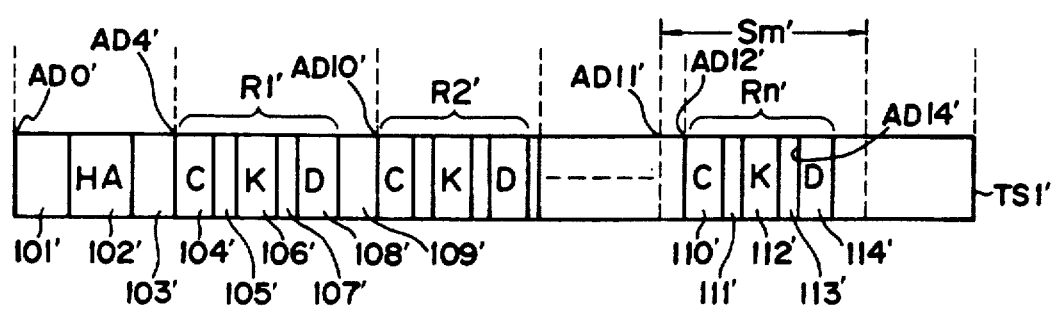
Figure 1C:
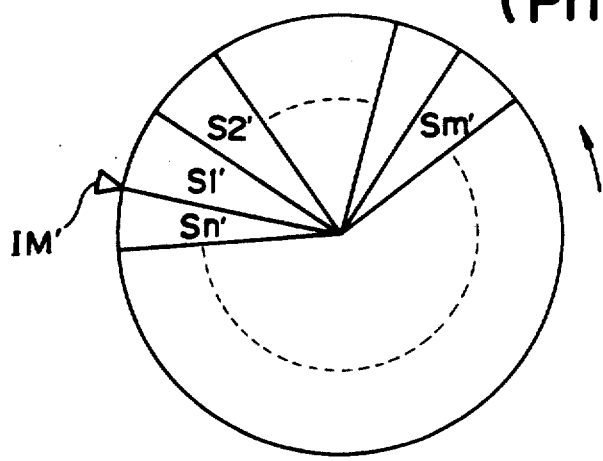
Figure 2:
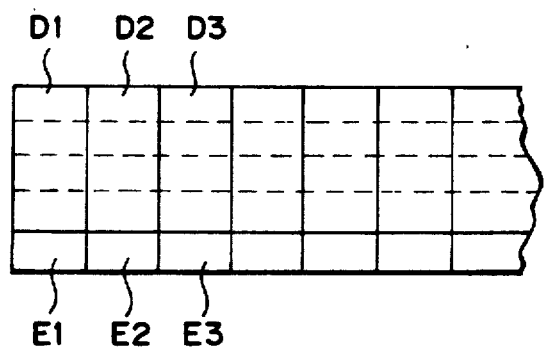
FIG. 2 is an explanatory drawing of a data configuration in which a 1-byte error correction code is added to data of 4 bytes.
Figure 3:
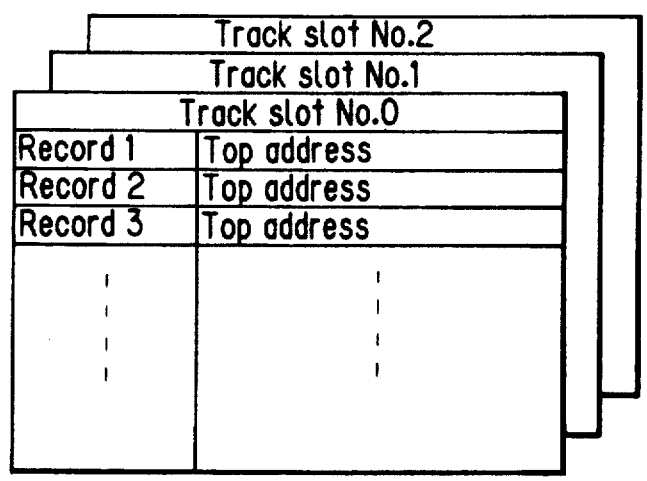
FIG. 3 is an explanatory drawing of an example table in which top addresses of records in each track slot are listed.
Figure 6A:
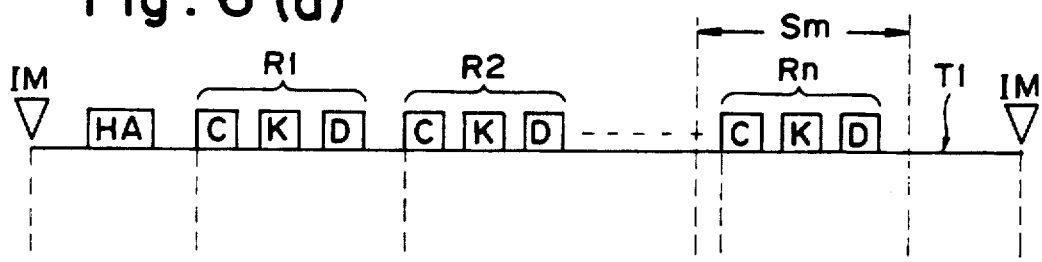
FIG. 6 (a) shows an example data format for recording data into a track on the magnetic disk.
Figure 6B:
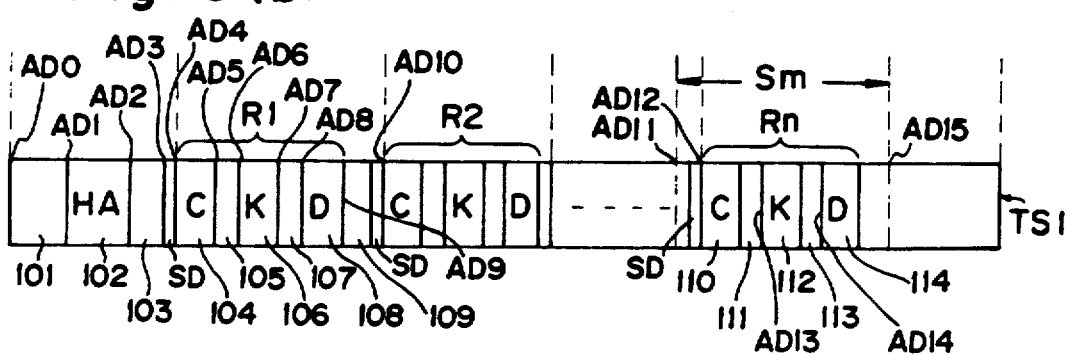

In the following description, an example will be described in which a track T1 shown in FIG. 6 (a) is formed on the magnetic disk provided in the magnetic disk unit 4 and the track T1 shown in FIG. 6 (a) is copied into a storage area formed by the IC memory group 31 of the disk cache 3 to form a track slot TS1 shown in FIG. 6 (b). In FIG. 6 (a), the same portions of the track format shown in FIG. 1 (a) are indicated with the same reference numerals as in FIG. 1 (a). Also in FIG. 6 (b), the same portions of the track format shown in FIG. 1 (b) are indicated with the same reference numerals as in FIG. 1 (b). FIG. 6 (b) differs from the conventional technique shown in FIG. 1 (b) mainly in that the address of data SD of special format is added between the count area C and a gap area existing just before the count area C. Also, the data stored into the IC memory group 31 of the disk cache 3 are data of 4 bytes to which an error correction code (ECC) of 1 byte is added as shown in FIG. 2.

Figure 7:
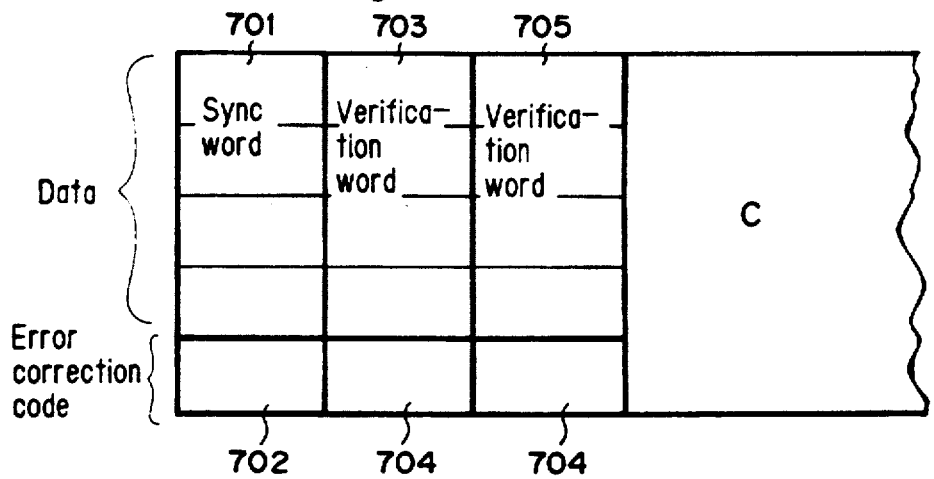
FIG. 7 shows example data SD of a special format shown in FIG. 6 (b)

In the first embodiment, said data SD of special format are composed, as shown in FIG. 7, of data in which a sync word 701 of 4 bytes in an address marker is combined with an error correction code 702 of 1 byte, data in which a verification word 703 of 4 bytes is combined with an error correction code 704 of 1 byte, and data in which a verification word 705 of 4 bytes is combined with an error correction code 706 of 1 byte. The data composed of the sync word 701 and error correction code 702 are data combination which is to be detected as a read error when read. The data composed of the verification word 703 and error correction code 704 are a data combination which is to be judged to be normal when read. Similarly, the data composed of the verification word 705 and error correction code 706 are a combination to be judged to be normal when read. The sync word 701 and verification words 703 and 705 are determined appropriately according to the above-mentioned criteria.

The data read from the magnetic disk unit 4 are supplied to the controller 2, further supplied to the write circuit 328 in the read/write section 32 through the disk transfer unit 23 and a bus B1, and stored from the write circuit 328 into the IC memory group 31 through a bus B2.

The above-mentioned operation for reading from the magnetic disk unit 4 and the operation of the micro program controller 21 will be described in detail. The magnetic head provided in the magnetic disk unit 4 is positioned at the track index marker IM of a track T1 on the magnetic disk, and then reads the data of the track index marker IM and delivers it to the controller 2. The micro program controller 21 of the controller 2 analyzes the data read from the magnetic disk unit 4 and transferred from the disk transfer unit 23 and detects that the data are for the track index marker IM. When detecting the input of the data of the track index marker IM, the micro program controller 21 starts a control over the data write according to the flow chart shown in FIGS. 8 (a) and (b). The data write into the track slot TS1 is effected synchronously with the data read from the magnetic disk unit 4.

Figure 8:
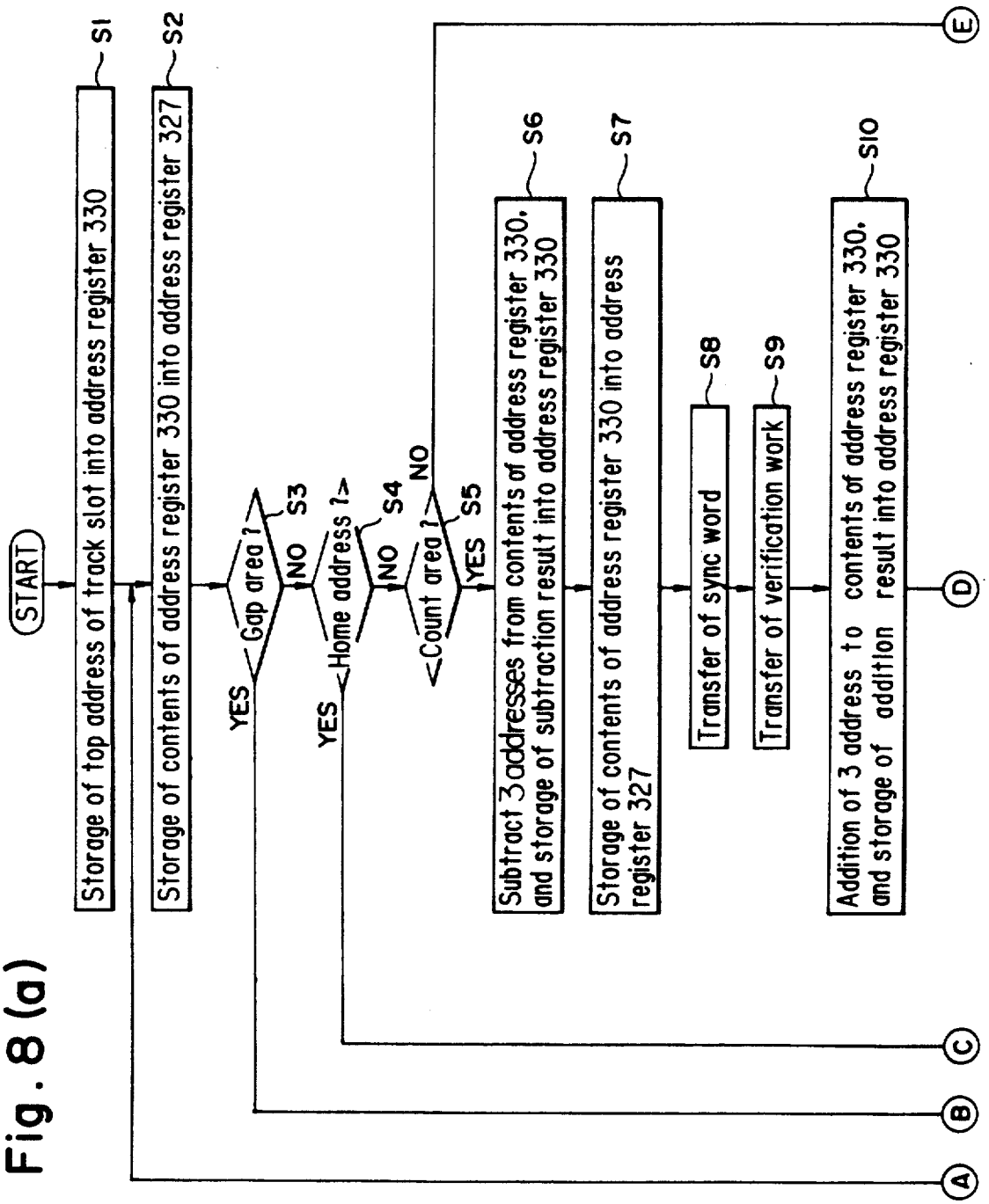
FIGS. 8 (a) and (b) are flow charts showing the write operations in the first embodiment shown in FIG. 5.
Figure 8B:
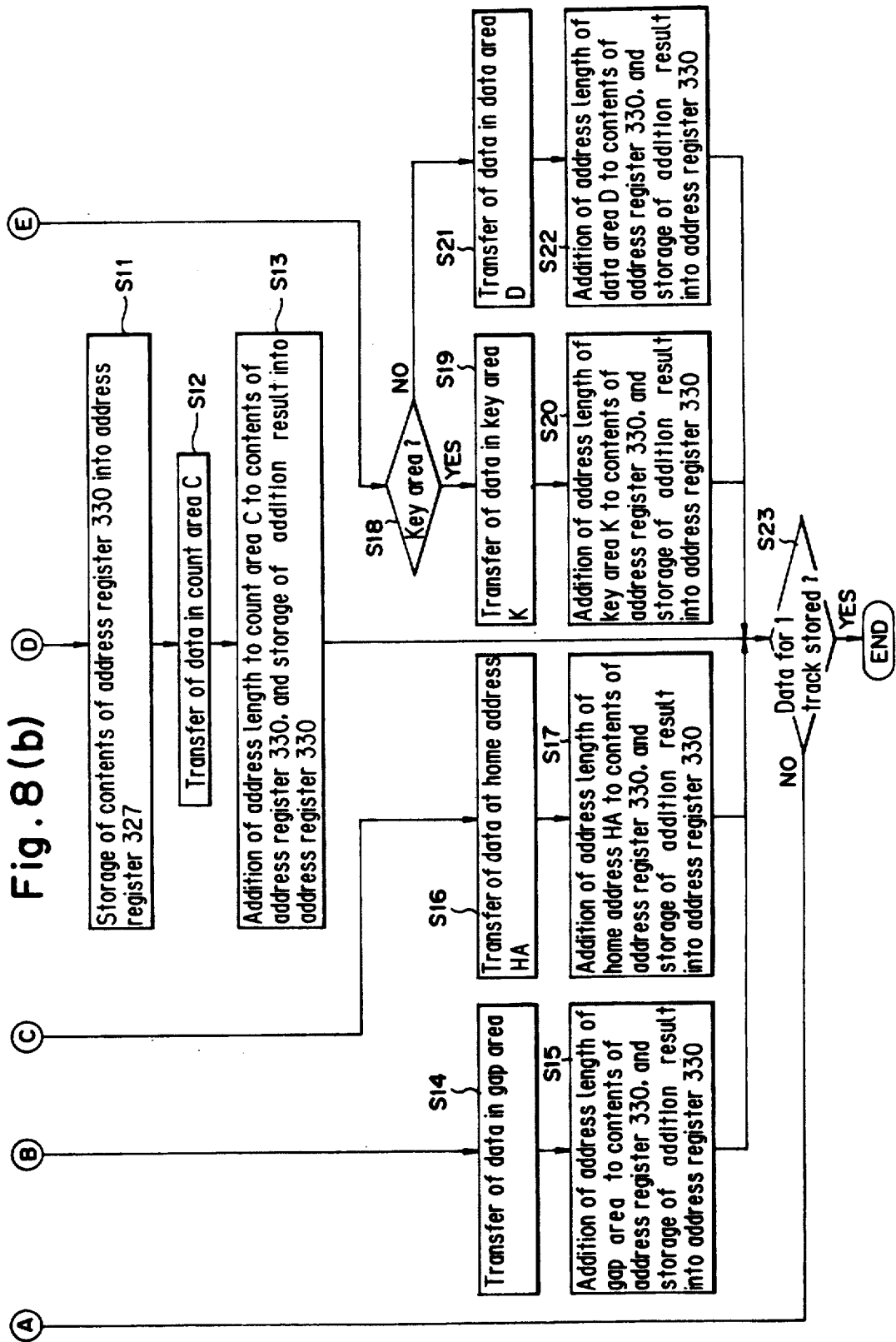

Next, an example in which the micro program controller 21 stores data in sequence from the address AD0 (FIG. 6 (b)) of the IC memory group 31 will be described. As shown in FIGS. 8 (a) and (b), the top address AD0 of the track slot TS1 is stored into the address register 330 at the step S1. Next, at the step S2, the top address AD0 of the track slot TS1 stored in the address register 330 is stored into the address register 327. At the step S3, the micro program controller 21 judges whether the area following the track index marker IM is a gap area. In this case, since the area following the track index marker IM is always a gap area, as is obvious from FIGS. 6 (a) and (b), the program proceeds to the step S14. At this step S14, the data in the gap area are transferred from the controller 2 to the disk cache 3, and the write circuit 328 in the read/write section 32 stores the above-mentioned transferred data in the IC memory group 31, taking the address AD0 of the IC memory group 31 as the write start address, whereby a gap area 101 is formed in the track slot TS1. The write circuit 328 recognizes the above-mentioned write start address based on the address AD0 stored in the address register 327. At the step S14, the address length of the above-mentioned gap area 101 is added to the address AD0 already stored in the address register 330 and a new address AD1 is stored into the address register 330. As is apparent from the foregoing, the steps S2, S14 and S15 are common to the write of the gap area.

Next, at the step S2, the contents (AD1) of the address register 330 are stored again into the address register 327. Since the gap has been passed, at the next step S4, it is judged whether the data read from the magnetic disk unit 4 are the data of the home address HA or not. In this case, since the data read from the magnetic disk unit 4 is always the data of the home address HA, as is apparent from FIGS. 6 (a) and (b), the program proceeds to the step S16. At the step S16, the data of the home address HA are transferred from the controller 2 to the disk cache 3, and the write circuit 328 of the read/write section 32 stores the data thus transferred in the IC memory group 31, taking the address AD1 of the IC memory group 31 as the write start address. The home address (HA) 102 is thus entered in the track slot TS1. The write circuit 328 recognizes the above-mentioned write start address based on the address AD1 stored in the address register 327. Next, at the step S17, the address length of the above-mentioned home address HA is added to the address AD2 already stored in the address register 330, and a new address AD2 is stored into the address register 330.

At next step S2, the contents (AD2) of the address register 330 are stored into the address register 327. Steps S3, S14 and S15 are executed again, whereby a gap area between the record RJ and home address HA is written into the IC memory group 31 taking the address AD2 of the IC memory gap 31 as the write start address. The gap area 103, is thereby formed on the track slot TS1. At next step S15, an address AD4 is stored into the address register 330.

Next, at the step S2, the contents (AD4) of the address register 330 are stored into the address register 327. At the next step S3, it is judged whether the data subsequently read from the magnetic disk unit 4 represent a gap area. Further at the step S4, it is judged whether the data read from the magnetic disk unit 4 are the data in the home address HA. At the step S5, it is judged whether the data read from the magnetic disk unit 4 are the data of the count area C. In this case, as seen from FIGS. 6 (a) and (b), the data are judged to be the data of the count area C, and the program proceeds to the step S6. At the step S6, three addresses are subtracted from AD4 stored in the address register 330, and address AD3 is newly stored into the address register 330. Further, at the step S7, the contents (AD3) of the address register 330 are stored into the address register 327. Because the data SD of special format shown in FIG. 7 are to be added just before the count area C.

Namely, at the step S8, the data of the sync word 701 are transferred from the controller 2 to the disk cache 3, and the write circuit 328 in the read/write section 32 stores the above-mentioned transferred data into the IC memory group 31, taking the address AD3 of the IC memory group 31 as the write start address. At this time, the write circuit 328 adds an error correction code 702 to the sync word 701 as shown in FIG. 7.

Next, at the step S9, the verification words 703 and 705 are transferred from the controller 2 to the disk cache 3, and the write circuit 328 stores them into the IC memory group 31, taking the address following the stored error correction code 704 as the write start address. At this time, the write circuit 328 adds error correction codes 704 and 706 to the verification words 703 and 705 as shown in FIG. 7. Data SD of special form are thereby entered in the track slot TS1 just before the count area (C) 104.

At the next step S10, three addresses are added to the contents of the address register 330, whereby address AD4 is stored into the address register 330. At the step S11, the address (AD4) stored in the address register 330 is stored into the address register 327. Next, at the step S12, the data of the count area C are transferred from the controller 2, and the write circuit 328 starts storing the above-mentioned data in the IC memory group 31, taking the address AD4 as the write start address. A count area (C) 104 is thus formed in the track slot TS1.

At the step S13, a number of addresses corresponding to the address length of the count area C are added to the address AD4 stored in the address register 330 a and the address AD5 is stored into the address register 330.

At the next step S2, the contents (AD5) of the address register 330 are stored into the address register 327. Next, the steps S3, S14 and S15 are executed again, and the gap area between the counter area C and key area K is written into the IC memory group 31 taking the address AD5 of the IC memory group 31 as the write start address, whereby the gap area 105 is formed in the track slot TS1. At the step S15, address AD6 is stored into the address register 330.

At the step S2, the contents (AD6) of the address register 330 are stored into the address register 327. Next, at the step S3, it is judged whether the data read from the magnetic disk 4 represent a gap area. Further at the step S4, it is judged whether the data read from the magnetic disk 4 are the data of the home address HA, and at the step S5, it is judged whether the data read from the magnetic disk 4 are the data of the count area C. At the step S18, it is judged whether the data read from the magnetic disk 4 are the data of the key area K. In this case, the data are judged to be the data of the key area K, and the program proceeds to the step S19. At this step S19, the data of the key area K are transferred from the controller 2 to the write circuit 328, which stores the data into the IC memory group 31, taking the address AD6 as the write start address. Thereby, the key area (K) 106 is formed in the track slot TS1. Next, at the step S20, a number of addresses corresponding to the address length of the key area K are added to the address AD6 stored in the address register 330, and address AD7 is stored into the address register 330.

At the step S2, the contents (AD7) of the address register 330 are stored into the address register 327 again. Next, at the steps S3, S14 and S15, the gap area between the key area K and data area D is written, taking the address AD7 of the IC memory group 31 as the write start address, thereby forming the gap area 107 in the track slot TS1. At the step S15, address AD8 is written into the address register 330.

The steps S2, S3, S4, S5 and S18 are then executed, and the program proceeds to the step S21. At this step S21, the data of the data area D are transferred from the controller 2 and the write circuit 328 stores the transferred data into the IC memory group 31, taking the address AD8 as the write start address. At the step S22, a number of addresses corresponding to the address length of the data area D are added to the address AD8 stored in the address register 330, and address AD9 is stored into the address register 330.

The above-mentioned operations are repeatedly done until it is judged at step S23 that all the data for one track have been stored. As the result, a data read from the track T1 of the magnetic disk unit 4 are stored into the track slot TS1.

The operation of the read/write section 32 for a reading of records written in the IC memory group 31 in the first embodiment shown in FIG. 5 will be described next. In the following description, it is assumed that the CPU 1 issues to the controller 2 a command for reading the record Rn existing in the track T1 on the magnetic disk shown in FIG. 6 (a), and that the track T1 designated by the command exists in the track slot T1 as shown in FIG. 6 (b).

The micro program controller 21 of the controller 2 recognizes the top address AD11 of the sector Sm in the track slot TS1 and bottom address AD15 of the sector Sm. Since, the byte length of one sector is determined from the total capacity of one track and the number of sectors composing one track and the number for the sector Sm is included in the above-mentioned command, the micro program controller 21 can easily determine the top address AD11 and bottom address AD15 from the top address AD0 of the track slot TS1, byte length of the above-mentioned one sector and the sector number for the sector Sm. It should be noted that the following description does not refer to the flow chart since the operations of the address register 330, etc. are similar to the operations for the read operation previously described.

The micro program controller 21 stores the above-mentioned top address AD11 into the address register 330, and this address AD11 stored in the address register 330 is stored as the retrieval start address into the address register 321. The micro program controller 21 also stores the above-mentioned bottom address AD15 as the retrieval end address into the address register 322. The micro program controller 21 stores the predetermined sync word 701 and verification words 703 and 705 into the register 326. In this condition, the read/write section 32 is put into operation.

The read/write section 32 starts the read operation from the data from the IC memory group 31 at the address AD11 stored in the address register 321. The data read from the IC memory group 31 are supplied to the read circuit 324 via the bus B3. The read circuit 324 judges whether the data in words supplied in sequence from the IC memory group 31 show a read error. When the supplied data are judged to be erroneous the read circuit 324 delivers the data to the comparator 325. The comparator 325 judges whether or not there is a coincidence between the sync word 701 stored in the register 326 and the above-mentioned data (the "first data" hereinafter) delivered from the read circuit 324. If both sets of data are judged to coincide with each other, and the read circuit 324 judges the next data in words delivered from the IC memory group 31 (the "second data" hereinafter) to be normal, the read circuit 324 delivers the second data to the comparator 325. The comparator 325 judges by comparison whether the verification word 703 stored in the register 326 coincides with the above-mentioned second data. When they are judged to be coincident with each other as the result of the comparison, and the read circuit 324 judges the next data in words delivered from the IC memory group 31 (the "third data" hereinafter) to be normal, the read circuit 324 delivers the third data to the comparator 325. This comparator 325 compares the verification word 705 stored in the register 326 with the above-mentioned third data to judge whether they are coincident with each other. If they are judged to be coincident with each other as the result of the comparison, the above-mentioned first data are verified to be the top address of the count area (C) 110.

Simultaneously, the address of the IC memory group 31 at which the above-mentioned first data are stored is stored into the address register 323 and transferred to the controller 2. Next, the micro program controller 21 receives the transferred address and stores into the address register 330 an address derived from the addition of three addresses to the transferred address. The address stored in the address register 330 is the top address (AD12) of the count area (C). The address stored in the address register 330 is stored into the address register 321. Taking as the transfer start address the address stored in the address register 321, the read circuit 324 starts transferring to the controller 2 the data read from the memory IC group 31. The micro program controller 21 of the controller 2 analyzes the transferred contents of the count area C to judge whether they represent the object record Rn. If the contents of the count area C are judged not to be the object record Rn, the controller 2 retrieves information such as the address length of the key area K and address length of the data area D from the contents of the count area C, determines the top address of a next count area C and sets it into the address register 330. The address stored in the address register 330 is stored into the address register 321, whereby a next count area is read from the IC memory group 31 and transferred to the controller 2 via the bus B4. The operations described in the foregoing are effected within a range from the address AD11 to address AD15 until the count area (C) 110 in the object record Rn is detected.

When the detected count area is judged to be that of the object record Rn, the address length (fixed length) of the count area (C) 110 and the address length (fixed length) of the gap area 111 are added to the address AD12 stored in the address register 330, and the top address AD13 of a new key area (K) 112 is stored into the address register 330. The address AD13 stored in the address register 330 is stored into the address register 321. Taking the address AD13 as the transfer start address, the read circuit 324 than transfers the data of the key area (K) 112 read from the IC memory group 31, to the controller 2 via the bus B4.

Next, the address length (variable length) of the key area (K) 112 and the address length (fixed length) of the gap area 113 are added to the contents (AD13) of the address register 330, and the top address AD14 of a new data area (D) 114 is stored into the address register 330. The micro program controller 21 recognizes the address length of the key area (K) 112 based on the contents of the count area (C) 110. The address AD14 stored in the address register 330 is stored into the address register 321. Taking the address AD14 as the transfer start address, the read circuit 324 then transfers the data of the data, area (D) 114 read from the IC memory group 31 to the controller 2 via the bus B4. The data of the record Rn is thus sent to the controller 2 via the bus B4 in this way. The operations having been described in the foregoing can be done under the action of the micro program controller 21.

In the first embodiment, the verification words 703 and 705 and error correction codes 704 and 706 are suffixed to the sync word 701 and error correction code 702, but the present invention is not limited to this embodiment. It is not always necessary to add the verification words 703 and 704 and error correction codes 704 and 706. In case the verification words 703, etc. are not added, read data is compared with the sync word after a read error occurs. If they coincide with each other, an address derived from addition of one address to the address at which the sync word is stored is recognized as the top address of the count area C.

Figure 9:
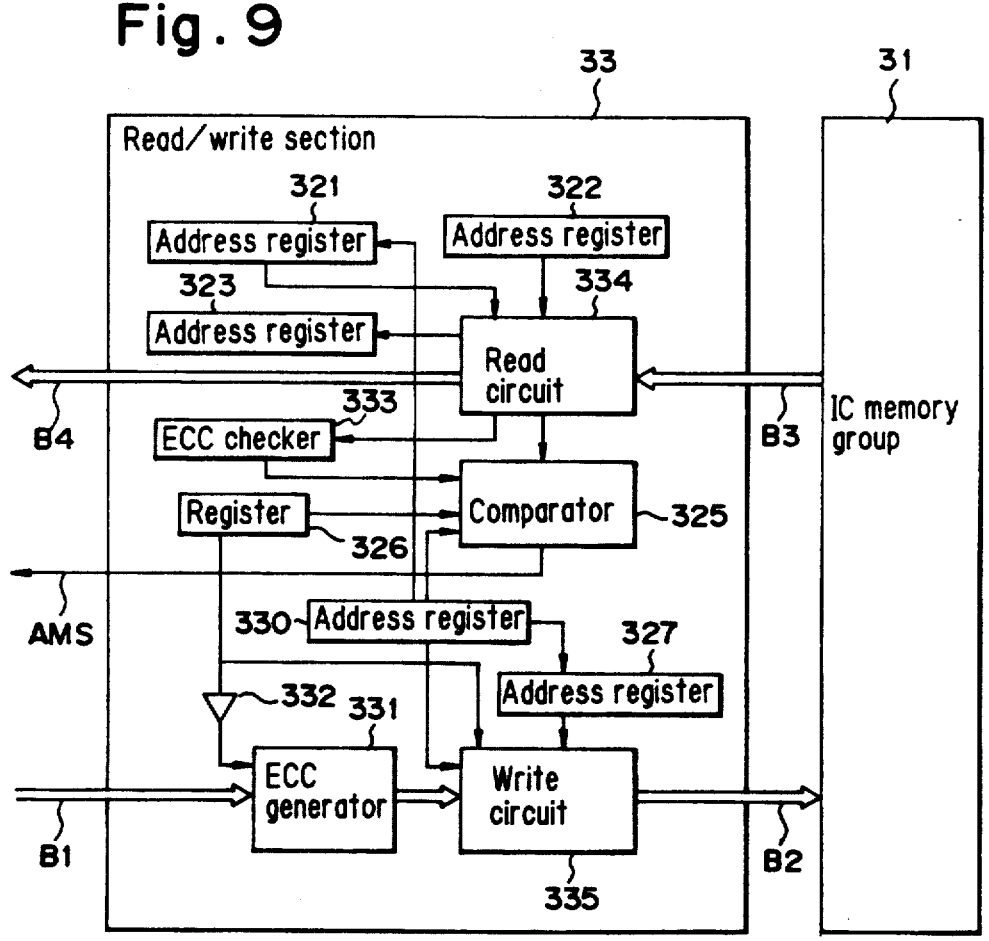
FIG. 9 is a block diagram showing a second embodiment in which the present invention is applied to a disk cache.

FIG. 9 is a block diagram of a second embodiment in which the present invention is applied to a disk cache. The disk cache 3 shown in FIG. 9 is composed of an IC memory group 31 and a read/write section 33. In the second embodiment shown in FIG. 9, the same elements as in the first embodiment of FIG. 5 are indicated with the same reference numerals as in FIG. 5. The differences of the second embodiment shown in FIG. 9 differs from the first embodiment shown in FIG. 5 is that the register 329 provided in the first embodiment is not provided in the second embodiment while an ECC generator 331, inverter 332, and an ECC check circuit 335 are provided in the second embodiment. In the second embodiment, the ECC check circuit 333 is provided outside the read circuit 334 and the ECC generator 331 is provided outside the write circuit 335. The majority of operations of the second embodiment shown in FIG. 9 are the same as those of the first embodiment shown in FIG. 5. Those operations that differ from those of the first embodiment will be described below.

First, the operation for copying the track T1 shown in FIG. 6 (a) into the storage area in the IC memory group 31 in the disk cache 3 thereby forming a track slot TS1 shown in FIG. 6 (b) will be described.

The data on the track T1 read from the magnetic disk unit 4 is stored into the IC memory group 31 through the bus B1, ECC generator 331 and write circuit 335 shown in FIG. 9. The micro program controller 21 detects that the next data written into the IC memory group 31 by the same method as in the first embodiment are the data of the count area C, and gives the read/write section 33 an instruction to write the sync word 701 stored in the register 326 just before the count area C. Since this operation is the same as in the first embodiment, it will not be explained further.

The read/write section 33 reads the sync word 701 from the register 326 and delivers it to the write circuit 335 and inverter 332. The inverter 332 inverts the sync word 701 to form a data pattern $\overline{701}$ and delivers it to the ECC generator 331. The ECC generator 331 delivers to the write circuit 335 an error correction code 701' generated from the data pattern 701. As the result, a write circuit 335 delivers the data pattern 701 and error correction code 701' just before the count area C and stores them into the IC memory group 31. The operations for writing into the address registers 327 and 330, etc. are the same as in the first embodiment.

Next, the reading of a selected record on the track slot from the IC memory group 31 will be described. In this case, the operations of the address registers 321, 322, 323, etc. are the same as in the first embodiment. The data read from the IC memory group 31 is supplied to the ECC check circuit 333 through the bus B3 and read circuit 334. The combination of the sync word 701 written just before the count area C and the error correction code 701' formed from the data $\overline{701}$ derived from the inversion of the sync word 701 is always judged to be error by the ECC check circuit 333. When the ECC check circuit 33 judges the combination to be error, the comparator 325 compares the read data with the sync word 701 stored in the register 326. If the result of comparison proves that they coincide with each other, the comparator 325 delivers a sync word detection signal AMS to the controller 2. Simultaneously with the above-mentioned operation, the top address AD12 of the IC memory group 31 in which the count area (C) 110 is stored is stored into the address register 323. The subsequent operations are the same as the operations in the aforementioned first embodiment.

It should be noted that in the second embodiment, the verification word shown in FIG. 7 may be suffixed to the combination of the sync word 701 and its error correction code 701'. The number of verification words may be arbitrarily selected.

The first and second embodiments have been described in the foregoing with reference to an application of the present invention to a disk cache. However, the present invention is not limited to this application but can be always applied to the storage into an IC memory or the like of the data read from the magnetic disk unit (for example, semiconductor memory unit, etc.)

In the foregoing, an example in which the data read from the magnetic disk unit 4 is stored into the disk cache 3 has been described. However, the present invention is not limited to such an example, but can be applied to the storage of the data delivered from the CPU 1 into a magnetic disk subsystem such as a disk cache, etc.

In the aforementioned first and second embodiments, the data on the track formed on the magnetic disk are stored along with the gap area into the track slot of the IC memory group. However, the present invention is not limited to this application, but the gap area on the track may not be stored into the track slot. In case no gap area is stored into the track slot, the steps S3, S6, S7, S14 and S15 are to be deleted in FIG. 7, for example, showing the operations of the first embodiment.

In the first embodiment, the bottom address AD15 is stored into the address register 322. However, the present invention is not limited to this arrangement, but for example the bottom address of the track slot TS1 may be stored into the address register 327. In case the bottom address of the track slot TS1 is stored into the address register 327 and the top address of the object count area C cannot be recognized by the retrieval from the address AD11 to the above-mentioned bottom address, the address register 321 may store the address AD0 and the address register 322 stores the address AD11 so that the retrieval is done in a range from the address AD0 to the address AD11.

In the first and second embodiments described in the foregoing disclosure, the read/write sections 32 and 33 are provided in the disk cache 3. However, the present invention is not limited to this arrangement, but the read/write sections 32 and 33 may be wholly or partially provided in the controller 2.

According to the present invention, a memory which stores the top address of each record is not required and it is possible to rapidly detect the top address of an object record.

What is claimed is:

1. A method for reading data contained in an IC memory group of a magnetic disk subsystem, the IC memory group storing a plurality of records including an object record, each said record being composed of a count area of fixed length, a key area of variable length, and a data area of variable length, wherein a data string of a special format containing an error detectable by ECC is provided before the count area of each record, comprising the steps of:

reading a data string from the IC memory group;

judging by ECC check whether the read data string contains an error;

if the read data string is judged to contain an error, judging whether the read data string is identical to the special-format data string; and if the read data string is identical to the special-format data string, adding a previously-determined address to the address at which the read data string is stored to establish the beginning address of the count area of the object record.

2. A method for reading data as claimed in claim 1, wherein the special-format data string comprises a sync word and an associated error correction code.

3. A method for reading data from an IC memory group and a magnetic disk subsystem, the IC memory group storing a plurality of records including an object record, each being composed of a count area of fixed length, a key area of variable length, and a data area of variable length, each said record including a first data string of predetermined special format designed to contain an error detectable by ECC and a second data string of special-format designed to contain no error detectable by ECC located before the count area of each said record, comprising the steps of:

reading a first data string from the IC memory group;

judging by ECC check whether the first read data string contains an error;

if the first read data string contains an error, judging whether the first read data string is identical to the first special-format data string;

if the first read data string is identical to the first special-format data string, reading a second data string following the first data string and judging by ECC whether the second read data string contains an error;

if the second read data string contains no errors, judging whether the second read data string is identical to the second special-format data string; and if the second read data string is identical to the second special-format data string, adding two previously-determined addresses to the address at which said first read data string is stored to establish the beginning address of the count area of the object record.

4. A method for reading data as claimed in claim 3, wherein said second read data string comprises at least two data strings, so that the address established as the starting address of the object record count area is established by adding the addresses of all data strings comprising the second read data string to the address at which the first read data string is stored.

5. A method for reading data as claimed in claim 3, wherein the first special-format data string comprises a sync word and an associated error correction code.

6. A method for reading data as claimed in claim 4, wherein the first special-format data string comprises a sync word and an associated error correction code.

7. A method for writing/reading data into/from an IC memory group in a magnetic disk subsystems, the IC memory group storing a plurality of records including an object record, each record including a count area of fixed length, a key area of variable length, and a data area of variable length, comprising the steps of:

writing a data string of a special-format designed to have an error detectable by an ECC check and an associated error correction code before the count area of each record;

reading a data string from a record contained in the IC memory group;

judging by ECC check whether the read data string contains an error;

if the read data string contains an error, judging whether the read data string is identical to the data string of special format; and if the read data string is identical to the data string of special format, adding a previously-determined address to the address of the read data string to establish the start address of the count area of the object record.

8. A method for writing/reading data as claimed in claim 7, wherein the data string of special format comprises a sync word and its associated error correction code.

9. A method for writing/reading data into/from an IC memory group of a magnetic disk subsystem, the IC memory group storing a plurality of records including an object record, each record including a count area of fixed length, a key area of variable length, and a data area of variable length, comprising the steps of:

writing a first special-format data string designed to contain an error detectable by ECC check and a second special-format data string designed to contain no error detectable by ECC check before the count area of each record;

reading a first data string from the IC memory group;

judging by ECC check whether the first read data string contains an error;

if the first read data string contains an error, judging whether the first read data string is identical to the first special-format data string;

if the first read data string is identical to the first special-format data string, reading a second data string following the first read data string;

judging by ECC check whether the second read data string contains an error;

if the second read data string contains no error, judging whether the second read data string is identical to the second special-format data string; and if the second read data string is identical to the second special-format data string, adding two previously-determined addresses to the address of the first read data string to establish the starting address of the count area of the object record.

10. A method for writing/reading data as claimed in claim 9, wherein said second read data string comprises a plurality of data strings, and the address established as the starting address of the object record count area is derived by adding the addresses of the data strings that comprise the second read data string to the address of the first read data string.

11. A method for writing/reading data as claimed in claim 9, wherein the first special-format data string comprises a sync word and an associated error correction code.

12. A method for writing/reading data as claimed in claim 10, wherein the first special-format data string comprises a sync word and an associated error correction code.

13. A method for writing/reading data into/from an IC memory group in a magnetic disk subsystem, the IC memory group storing a plurality of records including an object record, each record comprising a count area of fixed length, a key area of variable length, and a data area of variable length, comprising the steps of:

writing a combination of a special-format data string designed to contain an error detectable by an ECC check and an associated error correction code before the count area of each said record;

reading a data string from the IC memory group;

judging by ECC check whether the read data string contains an error; and if the read data string contains an error, adding a previously-determined address to the address at which the read data string is stored to establish the start address of the count area of the object record.

14. The method for writing/reading data as claimed in claim 13, further comprising the step of:

writing a verification word and an associated error correction code between the combination special-format data string/error correction code and the count area of each record.

15. The method for writing/reading data as claimed in claim 13, further comprising the step of:

writing a plurality of verification words and associated error correction codes between the combination special-format data string/error correction code and the count area of each record.

16. A method for writing/reading data as claimed in claim 13, wherein the special-format data string comprises a sync word.

17. A method for writing/reading data as claimed in claim 14, wherein the special-format data string comprises a sync word.

18. A method for writing/reading data as claimed in claim 15, wherein the special-format data string comprises a sync word.

* * * * *